(12) United States Patent
Hewitt et al.

(10) Patent No.: US 10,929,475 B2
(45) Date of Patent: Feb. 23, 2021

(54) FACILITATING A COLLABORATION EXPERIENCE USING SOCIAL NETWORKING INFORMATION

(71) Applicant: International Business Machines Corporation, Armonk, NY (US)

(72) Inventors: Trudy L. Hewitt, Cary, NC (US); Jeremy R. Fox, Georgetown, TX (US); Gregory J. Boss, Saginaw, MI (US); Liam S. Harpur, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 73 days.

(21) Appl. No.: 16/284,578

(22) Filed: Feb. 25, 2019

(65) Prior Publication Data

US 2020/0272663 A1   Aug. 27, 2020

(51) Int. Cl.
*G06F 15/16* (2006.01)
*G06F 16/9035* (2019.01)
(Continued)

(52) U.S. Cl.
CPC .......... *G06F 16/9035* (2019.01); *H04L 51/32* (2013.01); *H04L 65/403* (2013.01); *G06Q 50/01* (2013.01)

(58) Field of Classification Search
CPC ................................ H04L 67/10; H04L 51/32
See application file for complete search history.

(56) References Cited

U.S. PATENT DOCUMENTS 9,372,922 B2 * 6/2016 Shaashua ............... G06N 7/005
9,679,300 B2   6/2017 Lynch et al.
(Continued)

FOREIGN PATENT DOCUMENTS

WO   WO2015145142 A1   10/2015

OTHER PUBLICATIONS

"5 Statistical Methods for Forecasting Quantitative Time Series" Bista Solutions, Inc., https://www.bistasolutions.com/resources/blogs/5-statistical-methods-for-forecasting-quantitative-time-series/, May 31, 2016, pp. 1-16.
(Continued)

*Primary Examiner* — Yves Dalencourt
(74) *Attorney, Agent, or Firm* — Scully, Scott, Murphy & Presser, P.C.; Michael O'Keefe, Esq.

(57) ABSTRACT

A method, system and computer readable program storage device for facilitating a collaboration experience. In embodiments, the method comprises identifying a group of people for a specified collaboration experience; identifying specified conditions and preferences for the group of people; using the identified specified conditions and preferences for the group of people for determining an environment for the specified collaboration experience and one or more factors for improving the specified collaboration experience; and sending a specified set of information to one or more prospective collaboration entities to determine if any one of the prospective collaboration entities has the determined environment for the specified collaboration experience. The sending a specified set of information to one or more prospective collaboration entities includes providing the prospective collaboration entities with information to modify the determined environment for the specified collaboration experience to improve the specified collaboration experience.

18 Claims, 5 Drawing Sheets

(51) Int. Cl.
    *H04L 29/06*         (2006.01)
    *H04L 12/58*         (2006.01)
    *G06Q 50/00*        (2012.01)

(56) References Cited

U.S. PATENT DOCUMENTS

| | | |
|---|---|---|
| 2006/0143214 A1 | 6/2006 | Teicher |
| 2010/0205541 A1* | 8/2010 | Rapaport .............. G06F 16/285 |
| | | 715/753 |
| 2012/0278127 A1 | 11/2012 | Kirakosyan et al. |
| 2015/0248651 A1 | 9/2015 | Akutagawa et al. |
| 2016/0266740 A1* | 9/2016 | Glasgow .............. G06Q 10/101 |
| 2017/0070842 A1 | 3/2017 | Kulp et al. |
| 2017/0091881 A1 | 3/2017 | Canale et al. |
| 2017/0235848 A1* | 8/2017 | Van Dusen ........... G06F 16/904 |
| | | 705/12 |
| 2017/0300568 A1 | 10/2017 | Burgis |
| 2019/0108353 A1* | 4/2019 | Sadeh ................... G06F 21/604 |

OTHER PUBLICATIONS

"Application programming interface", Wikipedia, https://en.wikipedia.org/wiki/Application_programming_interface, last printed Feb. 22, 2019, 1 page.

"Geo-fence", Wikipedia, https://en.wikipedia.org/wiki/Geo-fence, last printed Feb. 22, 2019, pp. 1-3.

Chambers et al., "How to Choose the Right Forecasting Technique", Forecasting, Jul. 1971 issue, https://hbr.org/1971/07/how-to-choose-the-right-forecasting-technique, pp. 1-51.

\* cited by examiner

An API to query log activity for the social/collaboration network

```
<xs:element name="WorkLog" >
<xs:complexType>
<xs:sequence>
<xs:element ref="Performer" minOccurs="0"/>
<xs:element ref="Activity" minOccurs="0"/ >
<xs:element ref="Process" maxOccurs="unbounded"/>
</xs:sequence>
<xs:attribute name="description" type="xs:string"
```

FIG. 2

DETERMINE THE MODEL GROUP DYNAMICS OF THE STUDIED GROUP

DETERMINE THE OPTIMAL EXTERNAL ENVIRONMENT FOR THE TARGET GROUP

BROADCAST THE SOCIAL BASED CHARACTER SPHERE INFORMATION

FACILITATING A COLLABORATION EXPERIENCE USING SOCIAL NETWORKING INFORMATION

BACKGROUND

This invention, generally, relates to facilitating a collaboration experience using social networking information. More specifically, embodiments of the invention relate to identifying an environment for a collaborative experience for a group of people based, in part, on using information obtained from social networks to determine a character or character sphere of the group.

Social networks are becoming vital to providing real time input into dynamic applications and systems within today's interconnected world.

SUMMARY

Embodiments of the invention provide a method, system and computer readable program storage device for facilitating a collaboration experience. In embodiments, the method comprises identifying a group of people for a specified collaboration experience; identifying specified conditions and preferences for the group of people; using the identified specified conditions and preferences for the group of people for determining an environment for the specified collaboration experience and one or more factors for improving the specified collaboration experience; and sending a specified set of information to one or more prospective collaboration entities to determine if any one of the prospective collaboration entities has the determined environment for the specified collaboration experience. The sending a specified set of information to one or more prospective collaboration entities includes providing the prospective collaboration entities with information to modify the determined environment for the specified collaboration experience to improve the specified collaboration experience.

In embodiments, the sending a specified set of information to one or more prospective collaboration entities includes sending the specified set of information to the one or more prospective collaboration entities to modify the determined environment on demand to adjust dynamically to changing needs and requirements of the group of people.

In embodiments, the sending a specified set of information to one or more prospective collaboration entities further includes receiving from one of said one or more of the prospective collaboration entities, a return message indicating that the one of the prospective collaboration entities has the determined environment for the collaboration experience; and said one of the prospective collaboration entities modifies the determined environment of said one of the prospective collaboration entities, in response to receiving the specified set of information, to adjust dynamically to the changing needs and requirements of the group of people.

Embodiments of the invention bring together critical data, user preferences, and the dynamic availability of multiple resources to enhance decision making criteria to enable a smarter experience for users trying to collaborate.

Embodiments of the invention establish and publish a temporal baseline (scope) of preferences (e.g., preferred environment/experience for a specific duration) for a social group of people. Embodiments of the invention define the tension of the character of a group to derive how to manage the group's requirements. In embodiments, the invention understands what constitutes, and how to maintain, a character of a group, and the strength and tension based requirements of the group's character.

Embodiments of the invention derive a model of a target group's current and future dynamic/domain (e.g., using social network data, the system expects that in two hours this group is likely to leave).

For example, a group of seven friends wants to go out to a restaurant together, but they are having a difficult time finding a restaurant that everyone will enjoy and that has sufficient capacity available for their large group on a Saturday evening on short notice. Sometimes there are differences in likes, dislikes, preferences and other factor as well. Also, the restaurant or establishment is unaware of their preferred environment/experience. They need a highly dynamic system to recommend possible restaurants that would accommodate all the social preferences of the users, while still accommodating the capacity of the group. At present, no such system accommodates these types of temporal based requests dynamically across a large group of users in real time.

Embodiments of this invention effectively accommodates these types of requests in real time.

Embodiments of the invention analyze the optimal external environment for a group (e.g., the system may change a television channel to maintain or modify the desired group dynamic). This may involve, for example, defining what factors will break the character of the group and defining what factors will maintain or strengthen the character of the group.

Embodiments of the invention broadcast a social based "character" information set about a group to interested parties. For example, this information set may identify the tension and flexibility of the character of the group. The information set may be sent to prospective collaboration entities to confirm if certain conditions exist at these entities, or whether these conditions can be created and maintained at the entities.

Embodiments of the invention provide important value. For instance, social groups need to be highly dynamic in nature to accomplish certain tasks and objectives to provide clear value. Embodiments of the invention establish a temporal baseline and triggering mechanisms for short term social group dynamics. Also, embodiments of the invention have an ability to determine preferences for a group of users who may not know each other well.

As an additional embodiment, preferences could be weighted differently than needs. For example, one person in a group may not prefer Italian food, but will eat it; however, if a person in the group is a vegetarian, that requirement could have a higher weighting when calculating the character of the group.

If a group is at a restaurant, embodiments of the invention detect the likelihood of whether or not what is being ordered will be shared by multiple users and make adjustments if there is a high confidence of sharing. For example, wings are ordered as an appetizer, and the level of spice or the temperature of the wings can be factored in based on the wings being eaten by multiple users, given the wings' high confidence ranking for being shared.

In addition to food preferences, other user preferences can be taken into account for determining the character or character sphere of a group, such as the noise level of the group, the location of the group or its proximity to some place or event, the type of crowd the group is in (party, romantic), etc.

Embodiments of the invention can be used for other purposes for determining preferences of a group; for example, activities, music, purchase selection, etc.

BRIEF DESCRIPTION OF THE SEVERAL VIEWS OF THE DRAWINGS

FIG. 2 shows an API to query log activity for a social/collaboration network.

DETAILED DESCRIPTION

Embodiments of the invention provide a method, system and computer readable program storage device for facilitating a collaboration experience. In embodiments, the method comprises identifying a group of people for a specified collaboration experience; identifying specified conditions and preferences for the group of people; using the identified specified conditions and preferences for the group of people for determining an environment for the specified collaboration experience and one or more factors for improving the specified collaboration experience; and sending a specified set of information to one or more prospective collaboration entities to determine if any one of the prospective collaboration entities has the determined environment for the specified collaboration experience. The sending a specified set of information to one or more prospective collaboration entities includes providing the prospective collaboration entities with information to modify the determined environment for the specified collaboration experience to improve the specified collaboration experience.

Figure 1:
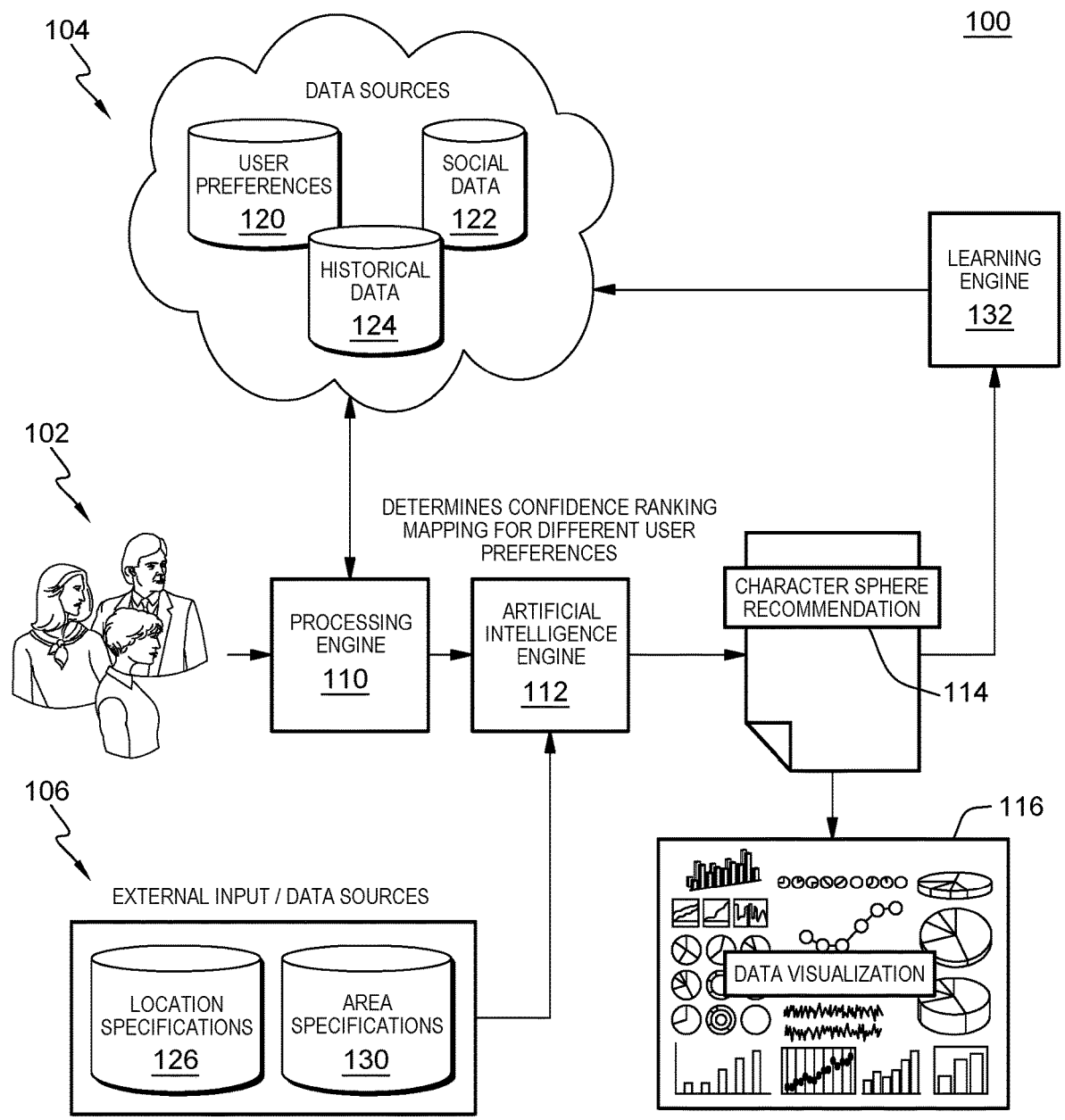
FIG. 1 diagrammatically illustrates a system and method of an embodiment of the invention.

FIG. 1 illustrates a method and system 100 for facilitating a collaboration experience using social networking, according to embodiments of the invention. FIG. 1 shows a group 102 of people or users, sources 104 of data about these people, external input/data sources 106, processing engine 110, and artificial intelligence engine 112. With the embodiment shown in FIG. 1, the processing and artificial intelligence engines output a recommendation, represented at 114, and a number of visualizations of the recommendation can be produced, as represented at 116. Also, with the embodiment of FIG. 1, data sources 104 include user preferences 120, social data 122 and historical data 124, and external input/data sources 106 include location specifications 126 and area specifications 130. FIG. 1, in addition, shows a learning engine 132 that can be used to learn ways to use the system 100 to generate recommendations.

Embodiments of the invention bring together critical data, user preferences, and the dynamic availability of multiple resources to enhance decision making criteria to enable a smarter experience for users trying to collaborate.

In embodiments, the invention includes three methods:

1. Deriving the model group by dynamics of the studied group (e.g., using social network data, the system identifies what determines the group dynamics over time).
2. Determining an external environment for the target group.
3. Broadcasting the social based character information to interested parties.

In the first method, an API is used to query log activity for the social collaboration network, and FIG. 2 illustrates an example API that may be used in embodiments of the invention.

Figure 3:
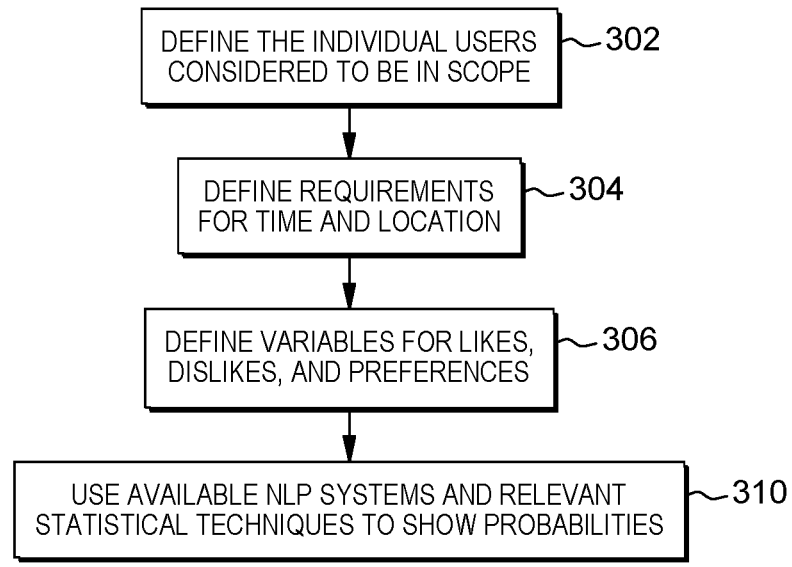
FIG. 3 shows steps used, in embodiments of the invention, to derive the model group dynamics of a studied group.

FIG. 3 shows steps that may be used in the first method in embodiments of the invention. Step 302 is to define the individual users considered to be in the subject group, or, in scope. In embodiments of the invention, a list is created of users considered to be in scope.

Determining the members of the group can be implemented in any suitable manner such as using caller identification for a phone call, analyzing usernames (e.g., social network), recognizing names, voice/facial recognition, device identification, biometric information, location information, and/or any other identification implementations. In some embodiments, users' names or identifications are manually input. For example, a user selects (by touchscreen, voice command, physical cue or thought control) from a contact list that he wants to meet up with person A, person B and person C.

Step 304 of FIG. 3 is to define requirements for time and location. In embodiments of the invention, requirements are defined for a start time, an end time, and a location or locations. Step 306 is to define variables for likes, dislikes, and preferences. Social likes can be gathered, for example, by collecting querying Social Likes as required. Dislikes can be gathered, for example, by utilizing past negative reviews as dislikes. To collect User Preferences, for instance, favorite places can be defined as potential places for the collaboration experience. User Biometrics can be collected, for example, by obtaining biometrics from smart watches or smart phones, and these biometrics can be analyzed to determine an individual user's attitude/state of mind/mood.

There are many ways of determining information about people in a group. For example, a data structure (e.g., database) is able to store users/contacts and their likes such as food likes/dislikes, activity likes/dislikes, and/or any other preferences. The data are able to be stored in any suitable manner. For example, a database may be generated for each group of a number of groups. The database is able to be populated by utilizing a crawler for crawling for information, manually, or any other manner. Other information is able to be determined and used such as age, health issues (e.g., allergies, high cholesterol, low carb diet), schools/colleges attended, location, and/or any other information.

Step 310 is to use NLP systems and relevant statistical techniques to show various probabilities. For instance, NLP systems and statistical techniques may be used to show, for example, that 77% of the time, calm background music affects the overall group positively, thereafter the decy rate of a new state is linear over five hours.

Alternatively, instead of modeling the group dynamics, embodiments of the invention model the group's preferences toward, for example, a specific food cuisine or activity (assuming a restaurant or similar venue is the destination).

Figure 4:
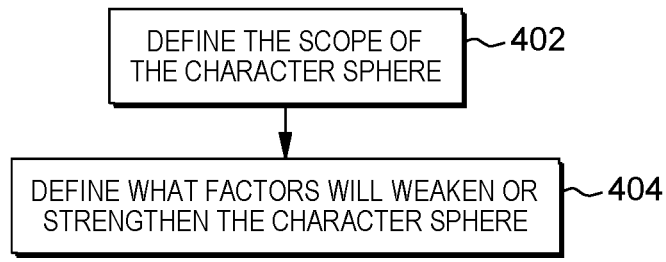
FIG. 4 shows steps used, in embodiments of the invention, to determine an external environment for a target group.

FIG. 4 shows steps that may be used, in embodiments of the invention, in the second of the above-listed methods—determining an external environment for the target group.

Step 402 is to define the scope of the character or character sphere of the target group—that is, to determine what constitutes the character or character sphere definition of the target group. As an example, the character of the group relates to discovered factors from the environment that influence the overall feeling of the group.

Step 404 is to define what factors will break or strengthen the character of the group. Available Natural Language Processing systems and relevant statistical techniques may be used to define these factors. Suitable NLP systems and statistical techniques are known in the art. For example, in embodiments of the invention, the system identifies a relevant correlation, and using relevant and multiple statistical techniques, determines that if the topic "trains and times" is mentioned, then the fragility of the "executed" character of the group is strengthened or weakened.

Figure 5:
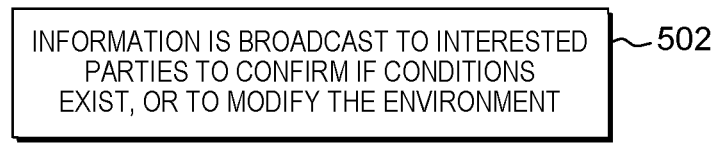
FIG. 5 shows steps used, in embodiments of the invention, to broadcast character information about a group to interested parties.

FIG. 5 shows a step that may be used, in embodiments of the invention, to broadcast the social based character, or character sphere, information of the target group to interested parties. The tension and flexibility of the character determined for this group are sent to prospective collaboration entities to confirm if conditions exist for the group, or to modify the environment to better suit the group.

At step 502 of this method, the system broadcasts that character or character sphere information to interested parties. As an example, data are sent to a prospective restaurant. The broadcast could be sent to multiple restaurants with a return request to confirm if certain specified conditions could be met.

Alternatively, the same broadcast could be sent to a single restaurant in order to influence thing like: which part of the restaurant the group is seated in; which waiter or waitress is assigned to the group, and the affect of the assigned waiter or waitress on the character of the group; automatically changing the channel on the television nearest the group; and adjusting the background music playlist, volume, etc.

The channel on the television could be changed by an application downloaded on a smart phone. The background music could be adjusted by using the application shown in FIG. 2.

In embodiments of the invention, information about the people in the group and prospective collaboration entities is monitored, processed and/or received. The information is monitored in real-time or non-real-time. For example, a phone call, microblog message (e.g., tweet), a social network message, an SMS message, and/or any other communication is monitored. Other communications that may be monitored include: email, documents, social networking/media content, webpages, user review sites message boards, web logs, any computing device communication, VoIP calls, chatting, video chatting, video conferencing, images, videos, live conversations, holographic images, recorded visual messages, and/or any other information.

The monitoring/processing/receiving is for acquiring information such as the names/IDs of the users involved in the group, time information, location information and/or any other information that may be helpful in the collaboration experience or event. In some embodiments, the tone/mood of a conversation/communication is analyzed/determined automatically. In embodiments, the users communicating are determined in any suitable manner such as by detecting a username, caller identification, voice/facial recognition, device identification, biometric analysis, and/or any other manner.

Depending on the information, the information may be processed. For example, audio is converted to text, and text is parsed for phrases. In some embodiments, specific keywords are searched for when parsing. For example, the phrases, "train," "want to get something to eat," or "dinner" are keywords/phrases that are searched for when monitoring/parsing. Then, the content after the specific keywords is parsed/analyzed/processed to acquire information relevant to collaborative experience.

Processing includes many aspects including, but not limited to, converting (e.g., audio into text), formatting, parsing, determining context, transmitting, searching, converting an image into text, analyzing and reconfiguring, and/or any other aspect that enables the information to be analyzed. In some embodiments, processing includes converting the information into a searchable format. In some embodiments, processing occurs concurrently with monitoring. In some embodiments, processing includes capturing/receiving and/or transmitting the information (e.g., to/from the cloud).

In embodiments, parsing is implemented in any suitable manner including, but not limited to, based on sentence structure (e.g., subject/verb determination), based on punctuation including, but not limited to, end punctuation of each sentence (e.g., period, question mark, exclamation point), intermediate punctuation such as commas and semi-colons, based on other grammatical features such as conjunctions, sentences, based on a change of a speaker (e.g., Speaker A is talking, then Speaker B starts talking), based on a word count, based on keywords/key phrases, based on search results, and/or any other manner.

In embodiments, information is received directly from one or more users as well. For example, users are able to manually input selections and/or other information. Furthering the example, a user is able to specify that he is available from 7 pm to 10 pm for dinner. In another example, the user is able to ask directly, "find a good place for dinner for a meeting."

In some embodiments, the implementation occurs without direct communication between parties. In embodiments, a user opens up an "app" to assist in, for example, determining the group for the collaboration experience, and the user provides details. In some embodiments, the app automatically recognizes the user by his name, username, phone number, IP address, device ID, voice recognition, and/or any other identifying information, and the additional parties of the group are either manually input and/or automatically determined/suggested based on social networking information and/or other information. The app is also able to modify selections depending on updated information—for example, traffic problems, long wait times, poor reviews, duration of time since last dining at a particular restaurant, and/or any other information.

In embodiments of the invention, additional information is analyzed. The information is analyzed in any manner, such as by text comparison, natural language comparison, comparing data structure/database information, and/or any other analysis/comparison. Analysis includes processing, computing, comparing and/or any other suitable form of analysis.

Examples of additional information include the current location of people that are meeting (or potentially meeting), the distance of those people to a particular location and/or in relation to other people meeting, the current traffic, hours of operation, wait times for locations (e.g., over one hour wait time at Z Restaurant), reservation information, weather information, user preferences and/or type of restaurant (e.g., noisy, good for kids, romantic, allows dogs, alcohol served).

The additional information can also include information from Internet of Everything devices, social network information, date/time/calendar information, dating site information, review information, review site selections, preferences (e.g., user likes seafood), likes/dislikes submitted on web pages, message board information (e.g., user comments, user thumbs up/down for another user's comment), viewed videos, location information (e.g., GPS information of each user, IP address location or basic user information), comments on web pages, and/or any other information.

The term "social networking system" or "social networking site" as used herein includes, but is not limited to, an online site, system or service that focuses on building and enabling social associations and interactions among users. The associations are able to be stored in any manner such as within a social graph. Users are able to generate associations with one another, and associations are able to be computer-generated. The associations are able to include groups of varying sizes.

In some embodiments, the current mood or physical status of the persons in the group is determined. In embodiments, the mood is determined based on facial analysis using a camera, user input/selections, analyzing user input (e.g., parsing text of a recent social networking post to find keywords), and/or any other way. In some embodiments, mood information and other information are determined using security cameras. The physical status is determined based on recent trip information (e.g., jet lagged from cross-country trip), based on date and occupation (e.g., early April is a busy/stressful time for CPAs due to tax season) and/or based on medical information (e.g., a person has a broken leg).

In some embodiments, the type of person/people is factored in to provide a suggestion. For example, if a person is adventurous, a different kind of cuisine is suggested often; however, if the person likes repetition, varying cuisines are not offered. The type of person analysis includes analyzing social network posts, determining the person is not negative often (e.g., does not write many negative reviews or "dislike" items), an input by the user, analyzing the person's food purchase history and/or likes/dislikes, and/or any other implementation.

In some embodiments, information can be from Internet of Everything devices. For example, a user has a centralized food/grocery list (e.g., digitally stored in the "cloud") which includes all of the food items in his house. In embodiments, when a smart device detects that an item is used (e.g., frozen pizza heated in microwave or user informs central storage by saying, "I'm eating ice cream now"), that information is able to be analyzed.

In some embodiments, the additional information includes health/medical information. The health/medical information is acquired in any suitable manner and from any of a number of source such as social network posts, personal web pages, and/or any other source. In some embodiments, social networking information and/or other third party information is used for source information. For example, Restaurant X may not know or list all of its allergy information, but customers are able to post that information using social networking, and that information is able to be searched, retrieved and used for providing recommendations and alerting a user of allergy concerns.

In some embodiments, health information is acquired using a monitoring device which records the information and/or sends the information to a cloud computing device. For example, a smart phone implements an app which monitors/measures user information such as heart rate, steps taken, blood pressure, blood sugar, cholesterol, weight, height, and/or respiratory function. In embodiments, health monitoring/measuring/analyzing devices are able to be used such as a health band, smart phone, smart watch, health watch, and other wearable health/medical technology. The health monitoring device is used in conjunction with other information such as eating schedules, caloric intake information, exercise schedules, work schedules, foods to avoid, and/or any other information to be compared with other user information.

Figure 6:
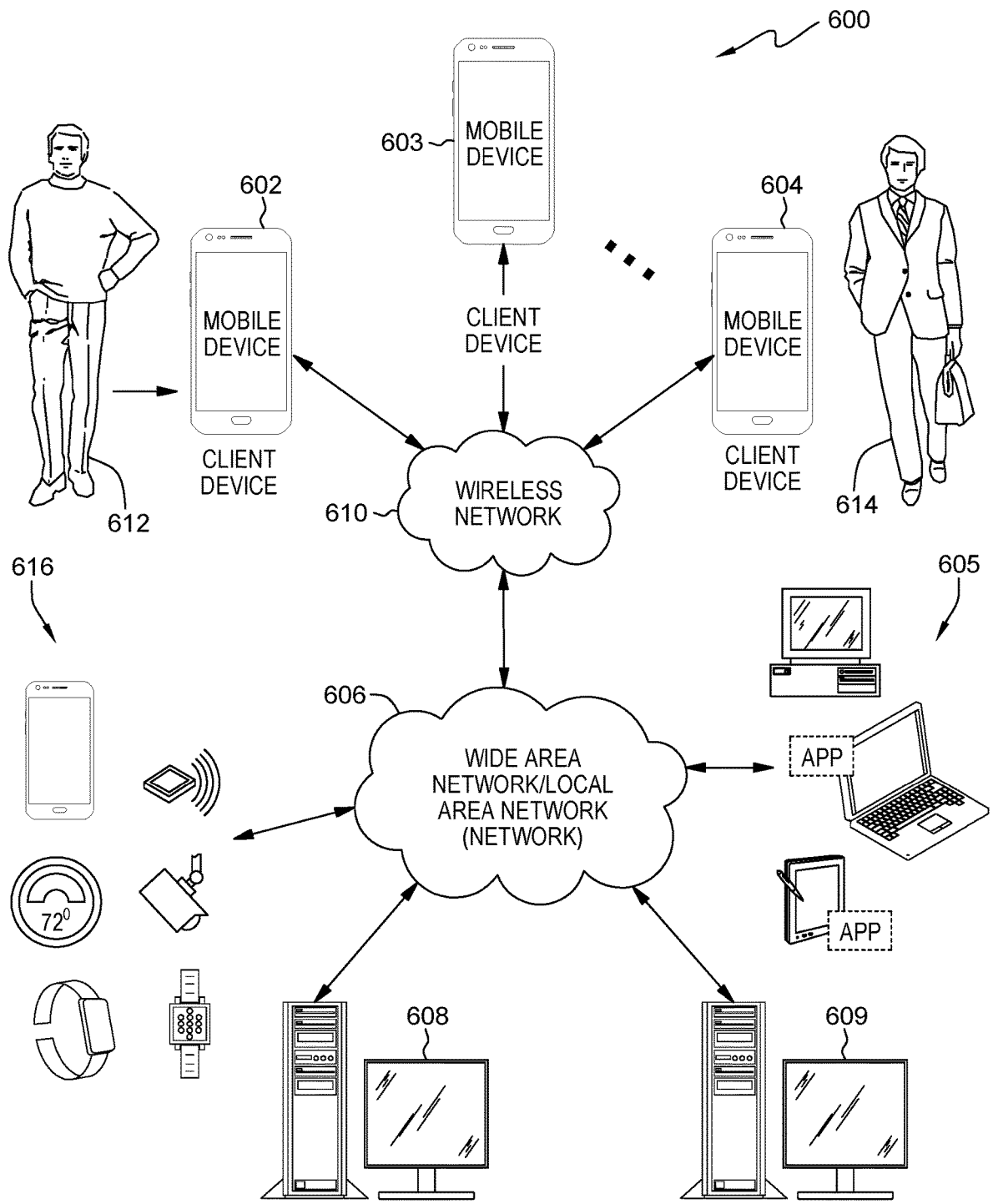
FIG. 6 shows a computer network that may be used in embodiments of the invention.

FIG. 6 shows components of an exemplary computing network environment 600 in which the invention may be practiced. Not all the illustrated components may be required to practice the invention, and variations in the arrangement and type of the components may be made without departing from the spirit or scope of the invention. As shown, system 600 of FIG. 6 includes local area networks ("LANs")/wide area network 606, wireless network 610, mobile devices 602-604, client devices 605, and servers 608-609. Computing network environment 600 also includes additional sensors or data devices 616, including devices referred to as Internet of Everything devices. FIG. 6 also shoes users 612 and 614.

Generally, mobile devices 602-604 may include virtually any portable computing device that is capable of receiving and sending a message over a network, such as networks 606 and wireless network 610. Such devices include portable devices, such as cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 602-604 typically range widely in terms of capabilities and features.

Mobile devices 602-604 may each receive messages sent from servers 608-609, from one of the other mobile devices 602-604, or even from another computing device. Mobile devices 602-604 may also send messages to one of servers 608-609, to other mobile devices, or to client devices 605, or the like. Mobile devices 602-604 may also communicate with non-mobile client devices.

Wireless network 610 is configured to couple mobile devices 602-604 and its components with network 606. Wireless network 610 may include any of a variety of wireless sub-networks that may further overlay stand-alone ad-hoc networks, and the like, to provide an infrastructure-oriented connection for mobile devices 602-604. Such sub-networks may include mesh networks, Wireless LAN (WLAN) networks, cellular networks, and the like.

Network 606 is enabled to employ any form of computer readable media for communicating information from one electronic device to another. Also, network 606 can include the Internet in addition to local area networks (LANs), wide area networks (WANs), direct connections, such as through a universal serial bus (USB) port, other forms of computer-readable media, or any combination thereof.

Servers 608-609 include virtually any device that may be configured to provide an application service. Such application services or simply applications include, but are not limited to, email applications, search applications, video applications, audio applications, graphic applications, social networking applications, text message applications, or the like. In one embodiment, servers 608-609 may operate as web servers. However, servers 608-609 are not limited to web servers.

Client devices 605 may include computational or communication device. For example, client devices 605 may include a personal computer (e.g., a laptop or desktop PC), a tablet computer, a smart phone, or another type of computational or communication device that can communicate with devices in network environment 600.

Network devices 616 may include a variety of devices that can communicate with other devices in network environment 600. Examples of network devices 612 include a location tag, an activity monitor, a thermostat, a monitoring camera, and a sensor device. Additional sensors such as pressure sensors, sound sensors or microphones and motion sensors may also be employed in network environment 600 to sense, monitor or record data or information. In one implementation, devices 616 may connect to the network 606 to report data or request information. In embodiments of the invention, devices 612 may also listen to and be paged from other devices via network 606. Devices 612 typically have one or more specific functions to perform, such as measuring, monitoring, and/or reporting data. Devices 612 may connect to network 606 in different ways, such as via a fixed Wi-Fi connection, a Bluetooth connection, a direct wireless network connection (e.g., a cellular connection using 3G, 4G or 5G standards), or a proprietary connection to a wireless network. While several specific network devices 612 are shown in FIG. 6, embodiments of the invention may use more, or fewer, network devices than are expressly shown in the Fig.

Those of ordinary skill in the art will appreciate that the architecture and hardware depicted in FIG. 6 may vary.

Figure 7:
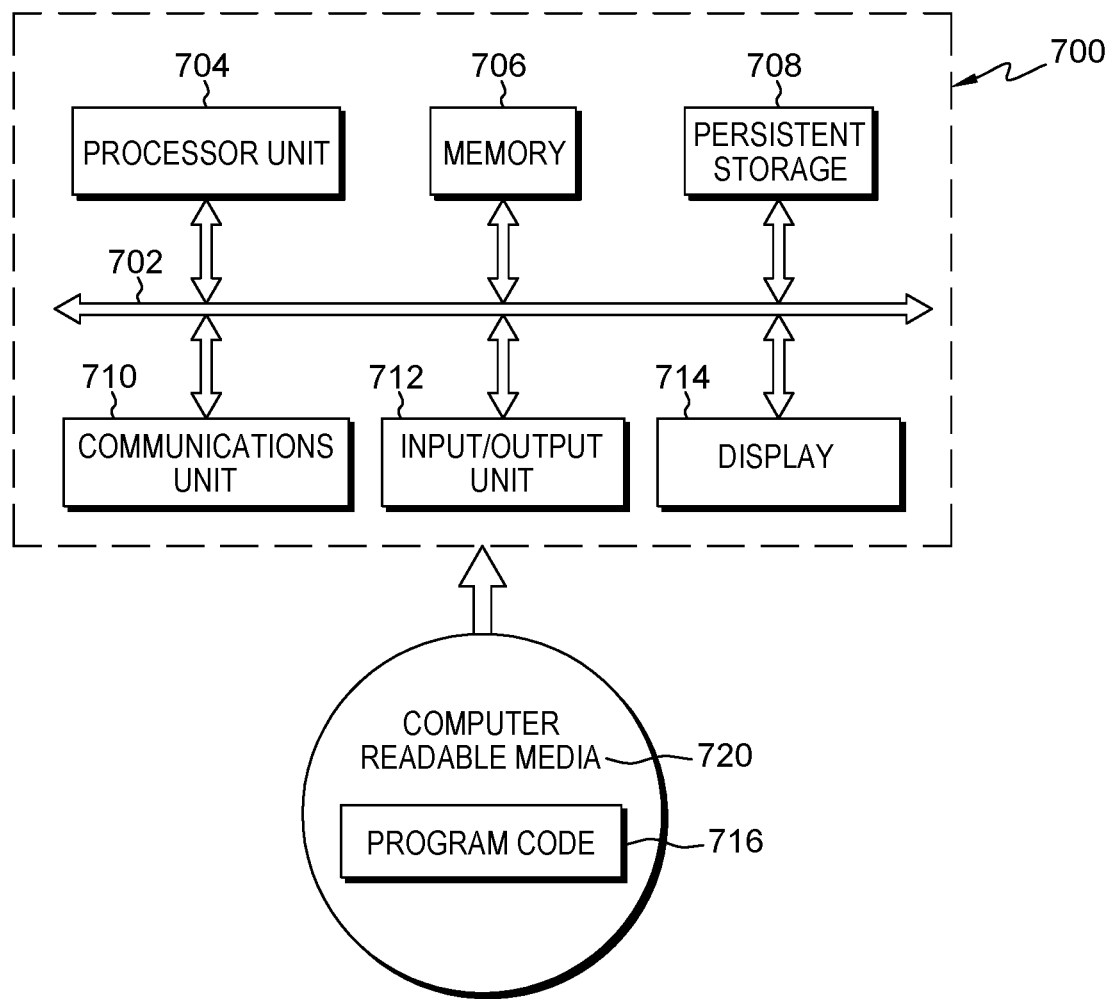
FIG. 7 depicts a processing unit that may be used in the system of FIG. 1 or the network of FIG. 6.

With reference to FIG. 7, a block diagram of a data processing system 700 is shown. Data processing system 700 is an example of a processing unit that may be used in, or with, embodiments of the invention. For example, data processing system 700 may also be used in or with network 600 of FIG. 6.

In this illustrative example, data processing system 700 includes communications fabric 702, which provides communications between processor unit 704, memory 706, persistent storage 808, communications unit 710, input/output (I/O) unit 712, and display 714.

Processor unit 704 serves to execute instructions for software that may be loaded into memory 806. Processor unit 704 may be a set of one or more processors or may be a multi-processor core, depending on the particular implementation. Memory 706 and persistent storage 808 are examples of storage devices. Memory 806, in these examples, may be a random access memory or any other suitable volatile or non-volatile storage device. Persistent storage 708 may take various forms depending on the particular implementation. For example, persistent storage 708 may be a hard drive, a flash memory, a rewritable optical disk, a rewritable magnetic tape, or some combination of the above.

Communications unit 710, in these examples, provides for communications with other data processing systems or devices. In these examples, communications unit 710 is a network interface card. Communications unit 710 may provide communications through the use of either or both physical and wireless communications links. Input/output unit 712 allows for input and output of data with other devices that may be connected to data processing system 700. For example, input/output unit 712 may provide a connection for user input through a keyboard and mouse. The input/output unit may also provide access to external program code 716 stored on a computer readable media 720. In addition, input/output unit 712 may send output to a printer. Display 714 provides a mechanism to display information to a user.

Those of ordinary skill in the art will appreciate that the hardware in FIG. 7 may vary depending on the implementation. Other internal hardware or peripheral devices, such as flash memory, equivalent non-volatile memory, or optical disk drives and the like, may be used in addition to or in place of the hardware depicted in FIG. 7.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of the invention has been presented for purposes of illustration and description, and is not intended to be exhaustive or to limit the invention in the form disclosed. Many modifications and variations will be apparent to those of ordinary skill in the art without departing from the scope of the invention. The embodiments were chosen and described in order to explain the principles and applications of the invention, and to enable others of ordinary skill in the art to understand the invention. The invention may be implemented in various embodiments with various modifications as are suited to a particular contemplated use.

The invention claimed is:

1. A method of determining a place for and facilitating a collaboration experience, comprising:
   identifying a group of people for a specified collaboration experience;
   identifying specified conditions and preferences for the group of people;
   using the identified specified conditions and preferences for the group of people for determining a type of place and environment for the specified collaboration experience and one or more factors for improving the specified collaboration experience at said type of place; and
   sending a specified set of information to one or more prospective places to determine if any one of the prospective places has the determined environment for the collaboration experience, including
      sending the specified set of information to each of the one or more prospective places with a request for a return message if said each of the prospective places has the determined environment for the collaboration experience, and
      when one of the prospective places has the determined environment, providing the one prospective place with information to modify the determined environment at the one prospective place for the specified collaboration experience to improve the specified collaboration experience and to better suit the group at the one prospective place.

2. The method according to claim 1, wherein the sending a specified set of information to one or more prospective places includes sending the specified set of information to the one or more prospective places to modify the determined environment on demand to adjust dynamically to changing needs and requirements of the group of people.

3. The method according to claim 2, further comprising:
   one of said one or more of the prospective places sending a return message to the group of people indicating that the one of the prospective places has the determined environment for the collaboration experience; and
   said one of the places entities modifying the determined environment of said one of the prospective places, in response to receiving the sent specified set of information, to adjust dynamically to the changing needs and requirements of the group of people.

4. The method according to claim 1, wherein the identifying specified conditions and preferences for the group of people includes deriving a model group dynamics of the group of people.

5. The method according to claim 4, wherein the deriving a model group dynamics of the group of people includes using social network data to determine the model group dynamics over time.

6. The method according to claim 5, wherein the using social network data to determine the model group dynamics over time includes:
   gathering likes and dislikes of the group of people from one or more social media sites;

collecting user preferences of the group of people from one or more network sites; and collecting user biometrics of the group of people from one or more biometric data sensing or biometric data storage devices.

7. The method according to claim 1, wherein the determining an environment for the collaboration experience for the group of people and one or more factors for improving the collaboration experience includes:

determining a defined character of the group of people.

8. The method according to claim 7, wherein:

the defined character of the group of people has a strength; and the determining an environment for the collaboration experience for the group of people and one or more factors for improving the collaboration experience further includes identifying one or more factors that strengthen or weaken the defined character of the group of people.

9. The method according to claim 1, wherein the sending a specified set of information to one or more prospective places to determine if any one of the prospective places has the determined environment for the specified collaboration experience further includes:

sending the specified set of information to each of the one or more prospective places to confirm if said each of the one or more prospective places can meet a set of specified conditions for the determined environment for the collaboration experience.

10. The method according to claim 1, wherein the identified specified conditions and preferences for the group of people include:

current locations of the people in the group of people; and distances of the people to a particular location and in relation to other people in the group.

11. A system for determining a place for and facilitating a collaboration experience, comprising:

a memory for storing data; and one or more processing units connected to the memory for sending data to and receiving data from the memory, said one or more processing units being configured for:

identifying a group of people for a specified collaboration experience;

identifying specified conditions and preferences for the group of people;

using the identified specified conditions and preferences for the group of people for determining a type of place and environment for the specified collaboration experience and one or more factors for improving the specified collaboration experience at said type of place; and sending a specified set of information to one or more prospective places to determine if any one of the prospective places has the determined environment for the specified collaboration experience, including sending the specified set of information to each of the one or more prospective places with a request for a return message if said each of the prospective places has the determined environment for the collaboration experience, and when one of the prospective places has the determined environment, providing the one prospective place with information to modify the determined environment at the one prospective place for the specified collaboration experience to improve the specified collaboration experience and to better suit the group at the one prospective place.

12. The system according to claim 11, wherein the sending a specified set of information to one or more prospective places includes sending the specified set of information to the one or more prospective places to modify the determined environment on demand to adjust dynamically to changing needs and requirements of the group of people.

13. The system according to claim 11, wherein the identifying specified conditions and preferences for the group of people includes deriving a model group dynamics of the group of people.

14. The system according to claim 11, wherein the determining an environment for the collaboration experience for the group of people and one or more factors for improving the collaboration experience includes determining a defined character of the group of people.

15. A computer readable program storage device comprising:

a computer readable storage medium having program instructions embodied therein for determining a place for and facilitating a collaboration experience, the program instructions executable by a computer to cause the computer to perform the method of:

identifying a group of people for a specified collaboration experience;

identifying specified conditions and preferences for the group of people;

using the identified specified conditions and preferences for the group of people for determining a type of place and environment for the specified collaboration experience and one or more factors for improving the specified collaboration experience at said type of place; and sending a specified set of information to one or more prospective places to determine if any one of the prospective places has the determined environment for the specified collaboration experience, including sending the specified set of information to each of the one or more prospective places with a request for a return message if said each of the prospective places has the determined environment for the collaboration experience, and when one of the prospective places has the determined environment, providing the one prospective place with information to modify the determined environment at the one prospective place for the specified collaboration experience to improve the specified collaboration experience and to better suit the group at the one prospective place.

16. The computer readable program storage device according to claim 15, wherein the sending a specified set of information to one or more prospective places includes sending the specified set of information to the one or more prospective places to modify the determined environment on demand to adjust dynamically to changing needs and requirements of the group of people.

17. The computer readable program storage device according to claim 15, wherein the identifying specified conditions and preferences for the group of people includes deriving a model group dynamics of the group of people.

18. The computer readable program storage device according to claim 15, wherein the determining an environment for the collaboration experience for the group of people and one or more factors for improving the collaboration experience includes determining a defined character of the group of people.

* * * * *